(12) United States Patent
Chen et al.

(10) Patent No.: US 8,515,392 B2
(45) Date of Patent: Aug. 20, 2013

(54) SELF-SUBSCRIPTION AND SELF-REACTIVATION TO A NETWORK

(75) Inventors: Xuming Chen, San Ramon, CA (US); Barry F. Hoffner, Bridgewater, NJ (US); Ho Yin Cheuk, Bridgewater, NJ (US); John Charles Powell, Marysville, OH (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 335 days.

(21) Appl. No.: 12/969,964

(22) Filed: Dec. 16, 2010

(65) Prior Publication Data
US 2012/0157047 A1    Jun. 21, 2012

(51) Int. Cl.
*G06F 7/04* (2006.01)
(52) U.S. Cl.
USPC ............ 455/411; 455/410; 455/435.1; 726/1; 726/2
(58) Field of Classification Search
USPC ........................ 455/410, 411, 435.1; 725/1–5
See application file for complete search history.

(56) References Cited

U.S. PATENT DOCUMENTS

| | | | |
|---|---|---|---|
| 6,529,727 B1 * | 3/2003 | Findikli et al. | 455/411 |
| 7,149,806 B2 * | 12/2006 | Perkins et al. | 709/229 |
| 2007/0136795 A1 * | 6/2007 | Youn | 726/5 |
| 2008/0064367 A1 * | 3/2008 | Nath et al. | 455/411 |
| 2012/0115457 A1 * | 5/2012 | Bouckaert et al. | 455/418 |
| 2012/0184274 A1 * | 7/2012 | Lopresti et al. | 455/435.1 |

* cited by examiner

*Primary Examiner* — Wesley Kim

(57) ABSTRACT

A method including receiving a network access request that includes an international mobile subscriber identity (IMSI) stored by a smart card associated with a user device; determining whether self-subscription to a service plan or reactivation of a suspended service plan is permitted based on self-activation data, wherein the self-activation data includes a mapping between IMSIs and data that indicates a granting or a denying of network access; selecting network access rights based on the self-activation data when it is determined that self-subscription to the service plan or reactivation of the suspended service plan is permitted; generating a temporary user profile based on the selected network access rights; and providing limited network access to the user device, wherein the limited network access permits a user to self-subscribe to the service plan or reactivate the suspended service plan.

22 Claims, 14 Drawing Sheets

SELF-SUBSCRIPTION AND SELF-REACTIVATION TO A NETWORK

BACKGROUND

Network operators and service providers provide various services to users based on some form of subscription to a service plan. For example, users' subscriptions to services are based on a pre-pay service plan (e.g., monthly, etc.) or on a pay-as-you-go service plan. Typically, users set up their subscriptions based on speaking with customer service representatives in the customer service departments affiliated with the network operators and the service providers.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "smart card," as used herein, is intended to be broadly interpreted to include, for example, an integrated circuit card (ICC), a universal integrated circuit card (UICC), a subscriber identification module (SIM) card, or a removable user identity module (RUIM) card. The smart card may be used with various user devices, as described further in this description.

According to exemplary embodiments, a network may permit non-subscribed users of the network to self-subscribe to services provided by the network based on user identifiers and/or subscription identifiers stored by smart cards. According to an exemplary embodiment, a network device may store self-activation data to permit the non-subscribed users limited access to the network and to be able to self-subscribe to services and become subscribed-users.

Additionally, according to exemplary embodiments, a network may permit suspended, subscribed users (e.g., having unpaid accounts, accounts that are out-of-funds, etc.) to reactivate services provided by the network based on user identifiers and/or subscription identifiers stored by smart cards. According to an exemplary embodiment, a network device may store self-activation data to permit the suspended subscribed users limited access to the network and be able to resolve suspension issues, resume services, and become subscribed users.

Figure 1A:
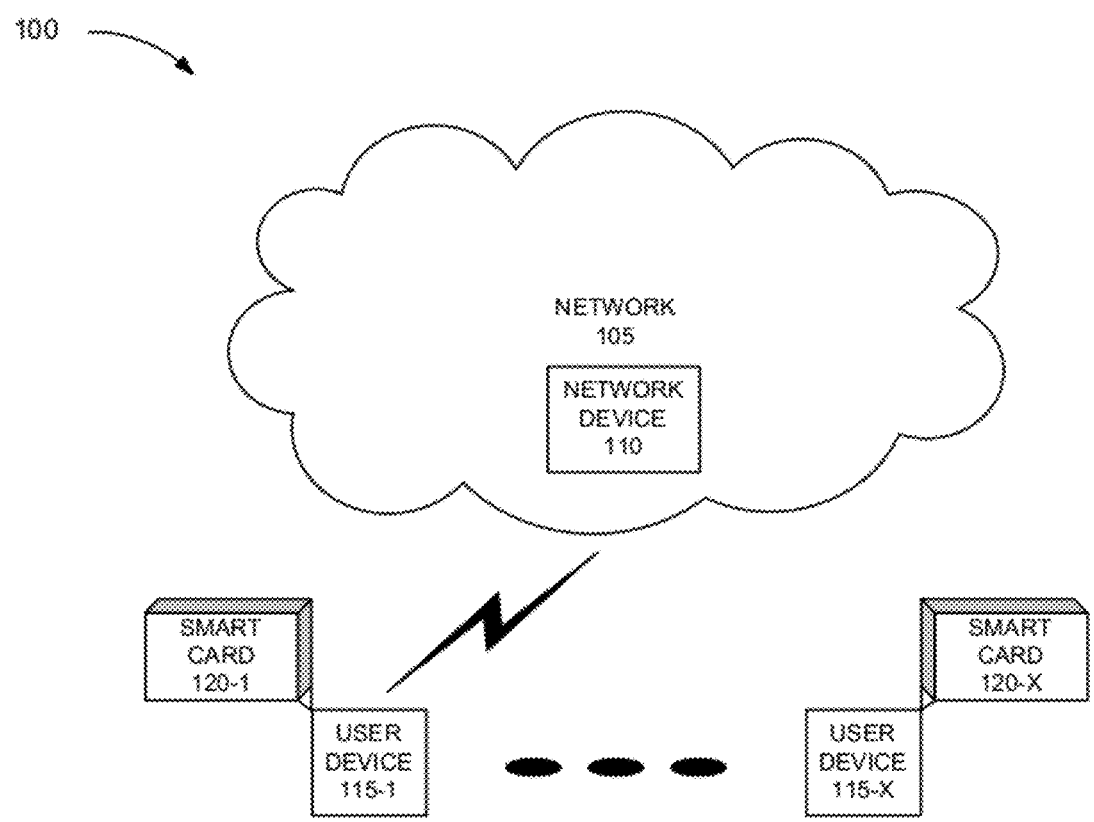
FIG. 1A is a diagram illustrating an exemplary environment in which an exemplary embodiment of self-subscription to services based on a smart card may be implemented.

FIG. 1A is a diagram illustrating an exemplary environment in which an exemplary embodiment of self-subscription to services based on a smart card may be implemented. As illustrated, an exemplary environment 100 may include a network 105 including a network device 110, and user devices 115-1 through 115-X (referred to as user devices 115 or user device 115) having smart cards 120-1 through 120-X (referred to as smart cards 120 or smart card 120).

Network 105 may include one or multiple networks of various types. The term "network," as used herein, is intended to be broadly interpreted to include a wireless network (e.g., mobile network, cellular network, non-cellular network, etc.) or a wired network. By way of example, network 105 may include a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, a Evolution Data Optimized (EV-DO) network, a Long Term Evolution (LTE) network, an evolved High Rate Packet Data (eHRPD) network, and/or some other type of wireless network or some other type of wired network (e.g., the Internet, an intranet, Public Switched Telephone Network (PSTN), etc.).

Network device 110 may include a device having the capability to communicate with other elements, devices, systems, and/or networks. According to an exemplary embodiment, network device 110 may store, manage, and/or have access to user profile information (also known as subscriber profile information) and self-activation data. For example, network device may correspond to a home subscriber server (HSS), a home location register (HLR), or some other suitable type of network device or network element.

User device 115 may include a device having the capability to communicate with other elements, devices, systems, and/or networks. User device 115 may correspond to a stationary device, a portable device, a handheld device, a mobile device, a vehicle-based device, or some other type of user device. As an example, user device 115 may correspond to a wireless telephone, a computer (e.g., a desktop, a laptop, a palmtop, etc.), a personal digital assistant (PDA), a gaming device, a music playing device, a video playing device, or a location-aware device. User device 115 may operate according to one or multiple communication standards, protocols, etc. User device 115 may communicate via a wireless connection and/or via a wired connection. User device 115 may use smart card 120, as described herein.

Figure 1B:
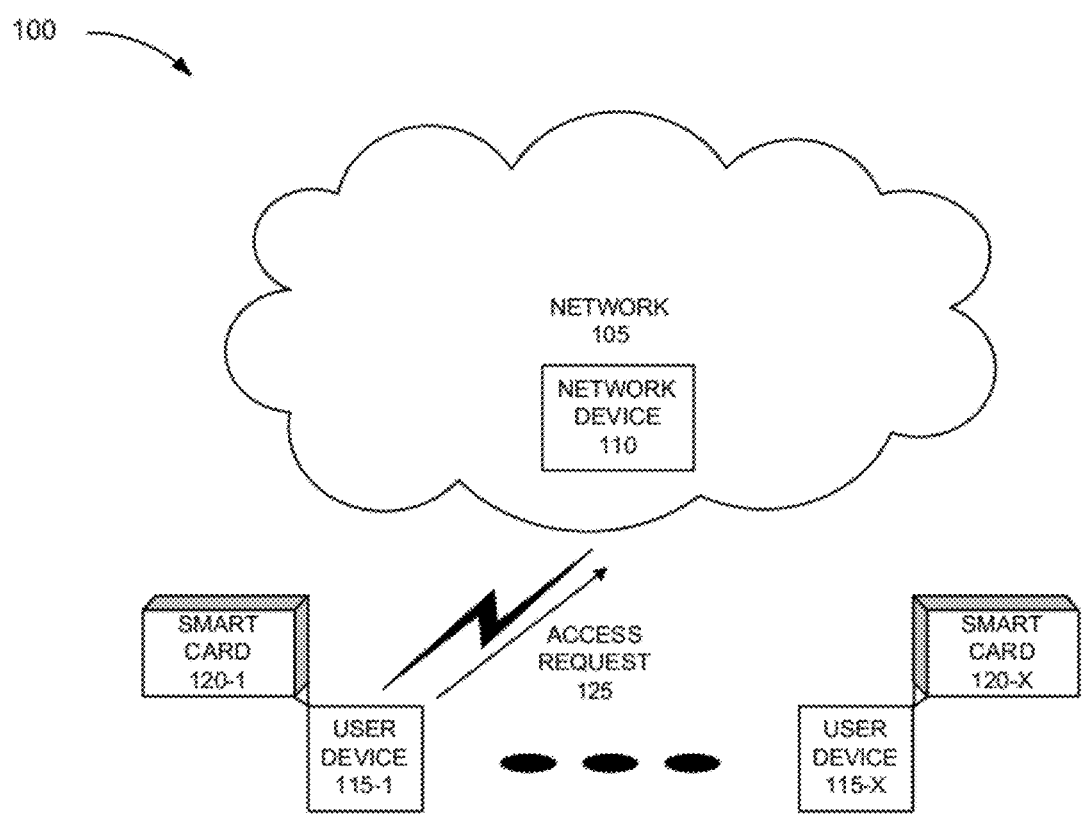
FIGS. 1B-1E are diagrams illustrating an exemplary process to self-subscribe based on the smart card.

FIGS. 1B-1E are diagrams illustrating an exemplary process to self-subscribe based on the smart card. In this example, it may be assumed that a user (not illustrated) of user device 115-1 and smart card 120-1 does not have a subscription to network 105. As illustrated in FIG. 1B, user device 115-1 may send an access request 125 to network 105. Access request 125 may include a user identifier, and/or an identifier of a type and/or a level of subscription. The user identifier and/or the subscription identifier may be stored by smart card 120-1.

Figure 1C:
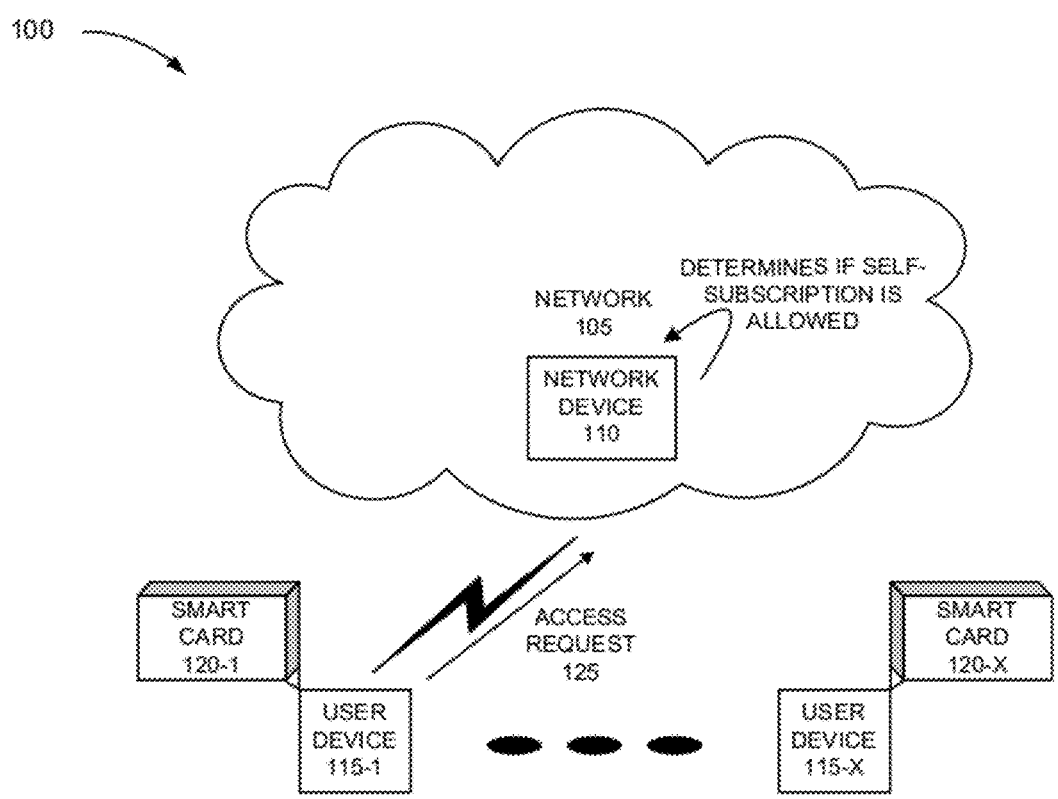

Referring to FIG. 1C, network device 110 may receive access request 125 and determine whether self-subscription is allowed based on access request 125. For example, network device 110 may store or have access to self-activation data that includes a mapping between user identifiers and/or subscription identifiers and data that indicates whether self-subscription is permitted for those user identifiers and/or subscription identifiers.

Figure 1D:
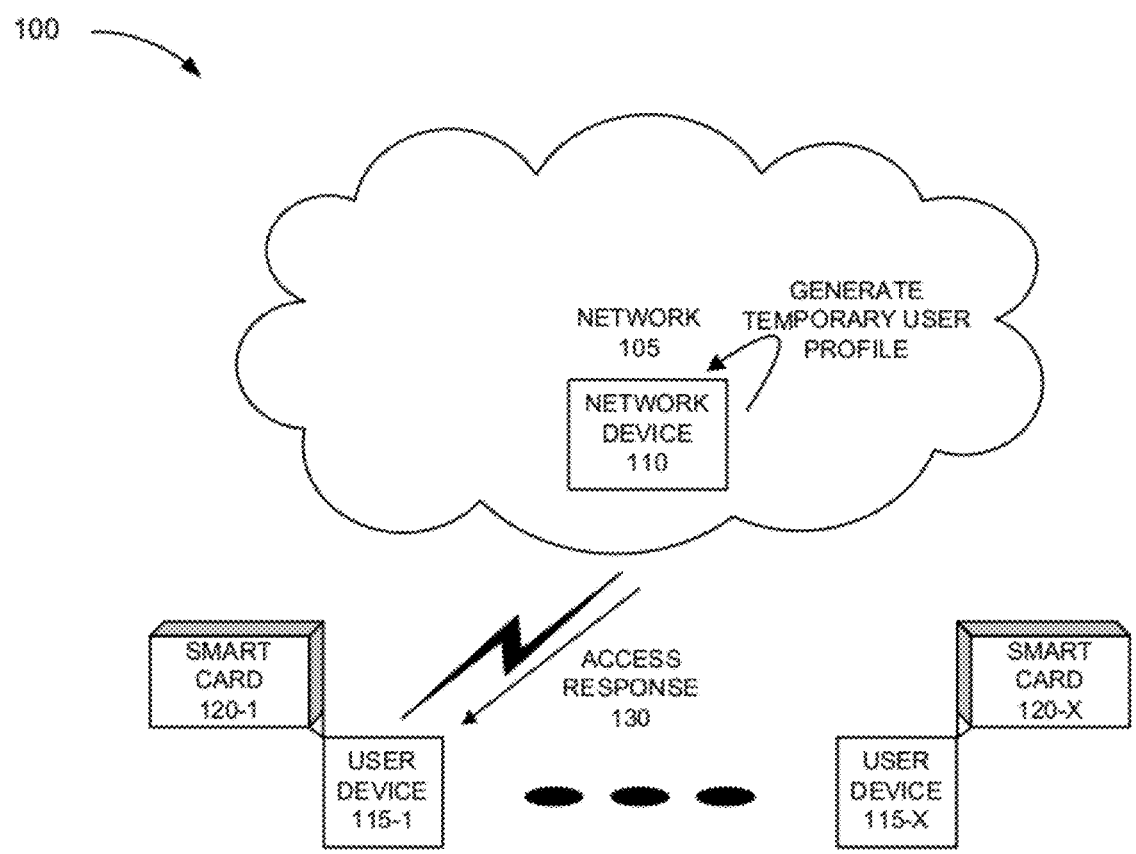
Figure 1E:
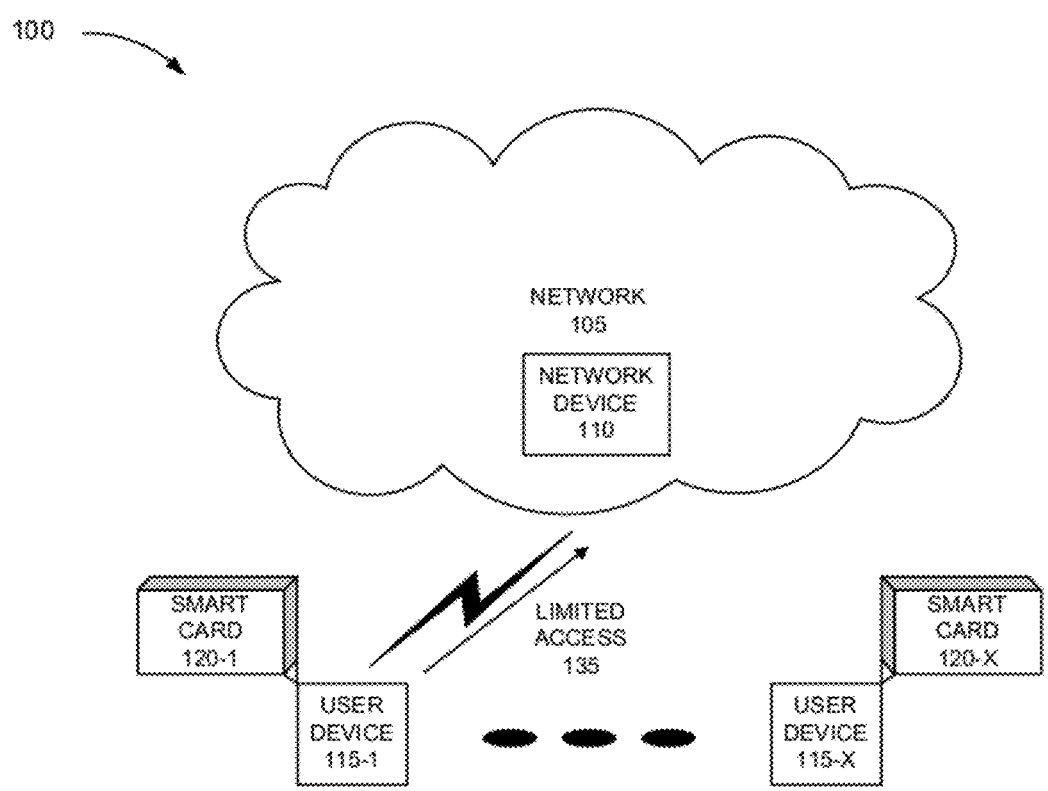

In this example, it may be assumed that network device 110 determines that the user may self-subscribe to network 105 based on the user identifier and/or the subscription identifier included with access request 125. Referring to FIG. 1D, network device 110 may generate a temporary user profile on behalf of the user based on access request 125. For example, network device 110 may generate a temporary user profile that includes network access rights for a non-subscribed user to allow self-subscription to services. Network device 110 may send an access response 130 to user device 115-1. Access response 130 may grant limited network access to the user in correspondence to the generated temporary user profile. As illustrated in FIG. 1E, user device 115-1 may have limited network access 135 to network 105. For example, the user may be automatically navigated or navigationally restricted to a self-subscription portal (e.g., web page(s)) to permit the user to self-subscribe to a service plan offered by network 105. Alternatively, the user may be automatically connected to a call center to permit the user to self-subscribe to a service plan.

Although FIGS. 1B-1E illustrate an exemplary process to self-subscribe based on a smart card, according to other embodiments, the process may include additional operations, fewer operations, and/or different operations. For example, according to other embodiments, the number and/or type of messages exchanged between user device 115 and network device 110 may be different. Additionally, or alternatively, network device 110 may perform additional operations and/or different operations pertaining to whether the user may self-subscribe and/or pertaining to the granting or the denying of network access. A further description pertaining to self-subscription to services and reactivation of suspended services based on the smart card is provided below.

As described above, users may self-subscribe to services or reactivate suspended services based on smart cards. With reference to self-subscription processes described herein, the state of the smart card may correspond to, for example, an inactivated state, an activated state, or an inactivated, provisioned state. When a user initially receives a smart card, the smart card may be in an inactive state. The smart card may begin an activation process when the smart card is inserted into a user device. However, the smart card may also require further activation by communicating with a network. For example, the network may include a smart card server that further activates the smart card and/or provisions the smart card for network access to the network. Additionally, or alternatively, the network may further activate and/or provision the smart card after the user self-subscribes to services, as described herein. With reference to reactivation processes described herein, the state of the smart card may correspond to, for example, an activated state or an activated, de-provisioned state, in which the de-provisioned state may pertain to network access rights and/or availability of services. The network may place the smart card in a provisioned state after the user reactivates suspended services, as described herein, which may allow the user complete network access rights and/or access to services corresponding to his/her subscription.

Figure 2A:
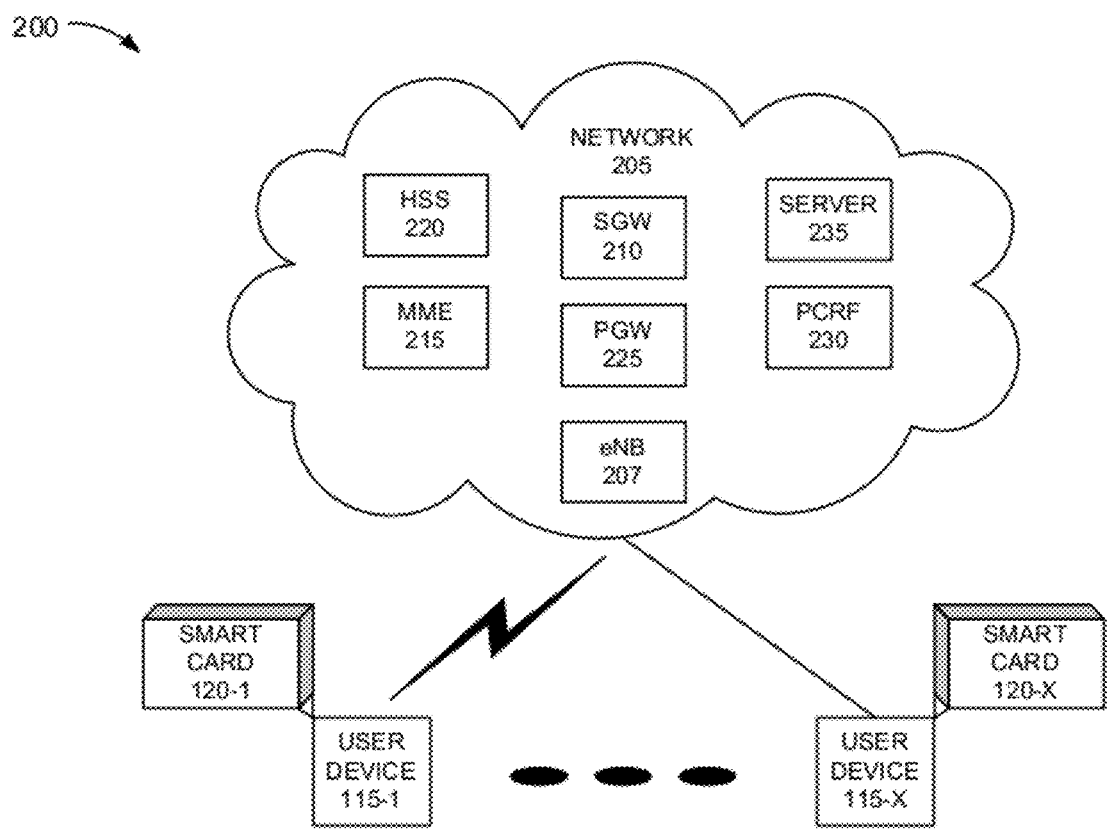
FIG. 2A is a diagram illustrating another exemplary environment in which an exemplary embodiment of self-subscription to services based on a smart card may be implemented.

FIG. 2A is a diagram illustrating another exemplary environment in which an exemplary embodiment of self-subscription to services based on a smart card may be implemented. As illustrated, environment 200 may include network 205 that includes an enhanced Node B (eNB) 207, a serving gateway (SGW) 210, a mobility management entity (MME) 215, an HSS 220, a packet data network (PDN) gateway (PGW) 225, a policy and charging rules function (PCRF) device 230, and a server 235. User devices 115 having smart cards 120 may communicate with network 205. According to an exemplary implementation of the LTE communication standard, SGW 210, PGW 225, and MME 215 may form an Evolved Packet Core (EPC) network.

The number of devices and configuration in environment 200 is exemplary and provided for simplicity. In practice, environment 200 may include additional devices, fewer devices, different devices, and/or differently arranged devices than those illustrated in FIG. 2A. For example, environment 200 may include a relay node, a home node B (HeNB), a femtocell, a picocell, a repeater, a radio node, etc. Additionally, or alternatively, environment 200 may include additional networks and/or different networks than those illustrated in FIG. 2A.

Also, according to other embodiments, one or more functions and/or processes described as being performed by a particular device in environment 200 may be performed by a different device or multiple devices. Additionally, or alternatively, one or more functions and/or processes described as being performed by multiple devices may be performed by different devices or a single device. Although FIG. 2A illustrates separate instances of SGW 210, PGW 225, MME 215, HSS 220, PCRF 230, and server 235, according to other embodiments, two or more of these devices may be combined. For example, MME 215 may be combined with SGW 210, or PCRF 230 may be combined with HSS 220, etc. Environment 200 may include wired and/or wireless connections among the devices illustrated.

User devices 115 may operate according to one or more versions of the LTE communication standard and/or one or more versions of the eHRPD communication standard. According to other embodiments, user devices 115 may operate according to one or more other wireless and/or wired network standards.

ENB 207, SGW 210, MME 215, and PGW 225 may each correspond to a network device that operates according to one or more versions of the LTE communication standard. Additionally, according to other exemplary embodiments, eNB 207, SGW 210, MME 215, and PGW 225 may operate according to one or more communication standards other than the LTE communication standard.

HSS 220 may include a network device that, among other things, stores subscriber subscription-related information (e.g., subscriber profiles, etc.) and self-activation data. HSS 220 may also provide other services (e.g., authentication, authorization, etc.). HSS 220 will be described further below. PCRF 230 may include a network device that manages bandwidth, charging rates, and policies. Server 235 may provide user interfaces (e.g., visual, auditory) to permit users to self-subscribe to services or self-reactivate suspended services offered by network 205. Depending on the type of access to network 205 (e.g., via the Web, via a telephone call, etc.), server 235 may provide web pages, an interactive telephone menu system, etc., to permit users to self-subscribe to services or self-reactivate suspended services.

Figure 2B:
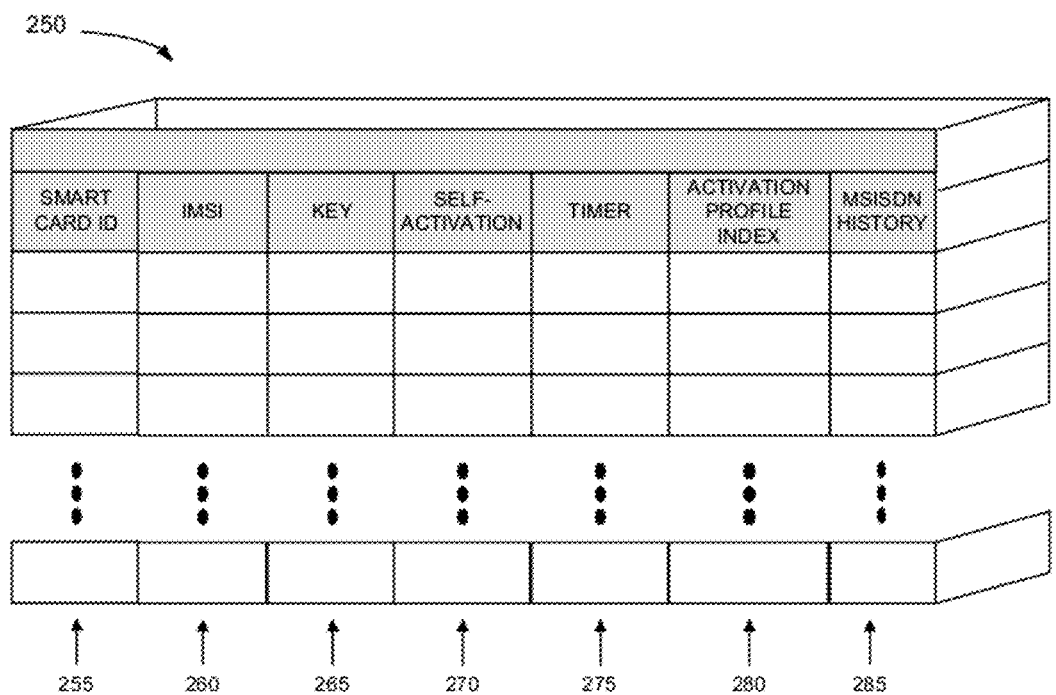
FIG. 2B is a diagram illustrating an exemplary table that includes exemplary self-activation data.

FIG. 2B is a diagram illustrating an exemplary table 250 that includes self-activation data. The self-activation data may be used during a self-subscription process and self-reactivation process, as described herein. According to an exemplary embodiment, HSS 220 may store or have access to table 250. According to other embodiments, table 250 may be stored by or accessible to an HLR or some other similar type of network device.

As illustrated, table 250 may include a smart card identifier field 255, an International Mobile Subscriber Identity (IMSI) field 260, a key field 265, a self-activation field 270, a timer field 275, an activation profile index field 280, and a Mobile Station Integrated Services Digital Network (MSISDN) history field 285. According to other embodiments, table 250 may include additional fields, fewer fields, and/or different fields than those illustrated in FIG. 2B and described herein. For example, table 250 may include a temporary mobile subscriber identity (TMSI) field, a mobile subscriber identification number (MSIN) field, an international mobile equipment identity (IMEI) field, a mobile equipment identifier (MEID) field, and/or a user field (e.g., to indicate a non-subscribed user, a suspended, subscribed user, a subscribed user, etc.). Additionally, according to other embodiments, the information included in table 250 may be stored in some other type of data structure (e.g., a linked list, a list, etc.), a database, multiple tables (e.g., relational tables, etc.), or some other form or arrangement of data.

Smart card identifier field 255 includes information that may indicate an identifier of the smart card. For example, the identifier may correspond to an integrated circuit card identifier (ICC ID). IMSI field 260 includes information that may indicate an identifier of a user and/or a subscription (e.g., a level of subscription, a type of subscription) associated with a user. For example, IMSI field 260 may include an IMSI or some other type of user identifier and/or subscription identifier. Key field 265 includes information that may pertain to authentication and/or authorization. For example, key field 265 may store an Authentication and Key Agreement (AKA) key, an authentication key, a pre-shared secret key, or authorization information (e.g., permissions, roles, etc.). Self-activation field 270 includes information that may indicate if self-activation is allowed or not allowed. For example, the information may indicate a "yes" or a "no."

Timer field 275 includes time information that may indicate a time period (e.g., a date, a timestamp) when self-subscription is permitted or not permitted (e.g., a quarantine period), when self-reactivation of suspended services is permitted or not permitted, and/or when a self-activation record (e.g., a row in table 250) is to be deleted from table 250. According to an exemplary embodiment, the time period may change and the meaning of the time period may change based on the type of network access and the network policies and rules pertaining to a particular network access. For example, the network access may pertain to self-subscribing to services or self-reactivating of suspended services.

The network policies and rules may establish certain time periods pertaining to self-subscription to services and self-reactivation of suspended services. For example, a non-subscribed user may have a certain period of time to self-subscribe after the issuance of a smart card and/or allowed a certain number of network access attempts to self-subscribe to a service plan. Similarly, a suspended, subscribed user may have a certain period of time to reactivate suspended services. For example, the network policies and rules may dictate a quarantine period after a user's account is suspended. During the quarantine period, the suspended, subscribed user may be prevented from self-reactivating his/her suspended services. After the quarantine period expires, a certain period of time to self-reactivate suspended services and/or a certain number of network access attempts to self-activate suspended services may be allotted. Additionally, according to an exemplary embodiment, the time information may be dynamic based on an outcome of a network access. For example, if a non-subscribed user attempts to self-subscribe to services, but does not self-subscribe, the time period may be shortened or lengthened or the number of network accesses allotted may be decreased or increased depending on the cause of the failure (e.g., user's refusal to select a service plan versus a network outage or a dropped connection occurring, etc.). The network policies and rules may also govern the information indicated in other fields in table 250 (e.g., self-activation field 270, activation profile index field 280) as well as operations performed by HSS 220 (e.g., determining whether self-subscription is permitted, a selection of an activation profile, generation of a temporary user profile, etc.), as described herein.

Activation profile index field 280 includes information that may indicate network access rights and/or network access behavior. By way of example, there may be different activation profiles in correspondence to when a user is expected to self-subscribe versus when the user is a suspended subscriber (e.g., a subscriber who has not paid his/her bill, etc.) and is expected to resolve suspension issues, when the network access corresponds to machine-to-machine communications (e.g., without user interaction) versus when the network access corresponds to user communications, or some combination thereof. For example, user device 115 having smart card 120, which stores an IMSI, may be associated with a suspended, subscribed user in which machine-to-machine communications may be used to resolve suspension issues based on an auto-pay system. MSISDN history field 285 includes information that may indicate the last x number of MSISDNs that have been associated with the IMSI. This information may be used, for example, to preserve ownership of an MSISDN for a suspended, subscribed user, or a user that terminated service and then wishes to re-subscribe to services.

Figure 2C:
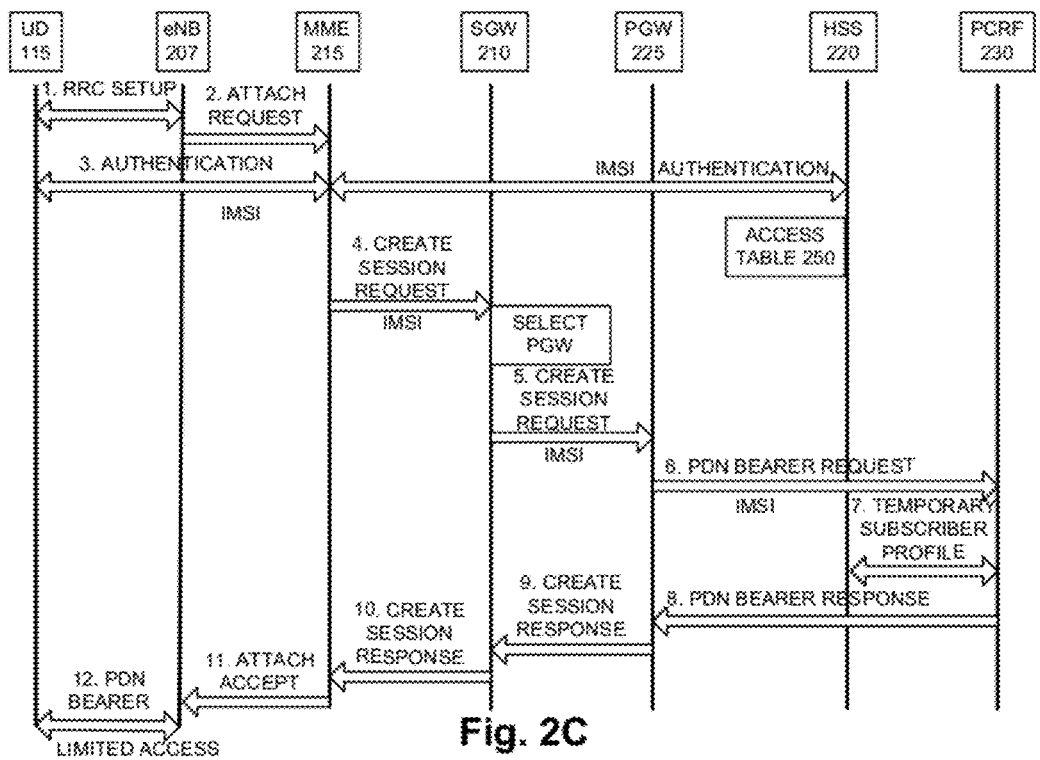
FIGS. 2C and 2D are diagrams illustrating an exemplary process in which self-subscription based on a smart card may be implemented.
Figure 2D:
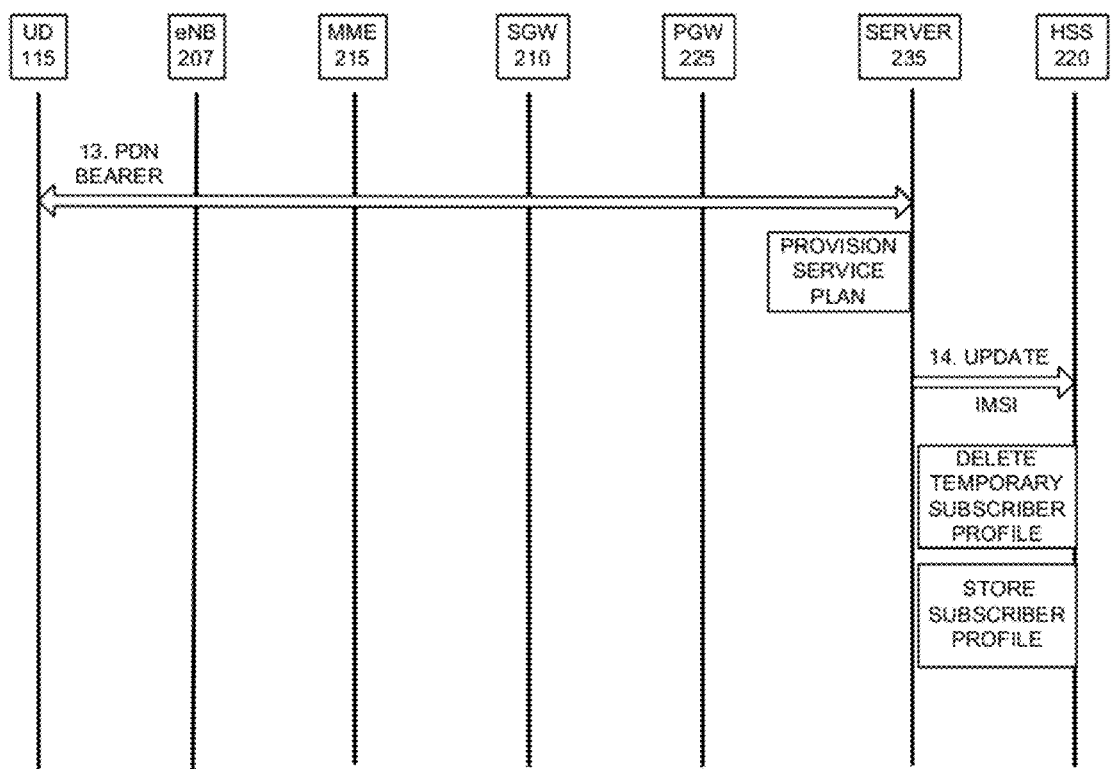

FIGS. 2C and 2D are diagrams illustrating an exemplary process in which self-subscription based on a smart card may be implemented. Referring to FIG. 2C, it may be assumed that user device (UD) 115 (having smart card 120) and eNB 207 exchange messages to establish a radio resource control (RRC) connection. As illustrated, eNB 207 may send an attachment request to MME 215. After an RRC connection is established, an authentication procedure may begin. For example, UD 115 may send an authentication request that is received by MME 215. The authentication request may include an IMSI stored by smart card 120. The authentication request may also include information pertaining to authentication (e.g., an authentication key, etc.). MME 215 may send an authentication request to HSS 220 that includes the IMSI. HSS 220 may access table 250 that stores data pertaining to self-subscription. HSS 220 may select the appropriate self-activation record based on the IMSI. HSS 220 may then determine whether self-activation is permitted based on self-activation field 270. HSS 220 may also access timer field 275 to determine if a time period to self-subscribe is permitted, as well as other fields (e.g., key field 265 for authentication purposes). According to other embodiments, HSS 220 may access a user field to determine a type of user (e.g., a subscribed user, a non-subscribed user, a suspended, subscribed user, etc.) (not illustrated in FIG. 2B).

In this example, HSS 220 may determine that self-subscription is permitted. HSS 220 may generate a temporary subscriber profile using the information stored in activation profile index 280. In the event that multiple activation profiles are stored, HSS 220 may select the appropriate activation profile based on other fields in table 250, such as timer field 275 (e.g., pertains to self-subscription or resuming of services), type of user, type of communication (e.g., machine-to-machine, etc.), etc. HSS 220 may also authenticate the smart card based on smart card identifier field 255. For example, HSS 220 may compare the information in smart card identifier field 255 with authentication information included in the authentication request. HSS 220 may send an authentication response to MME 215. The authentication response may include the IMSI.

MME 215 may then send a create session request to SGW 210. SGW 210 may select a PGW 225 based on the IMSI. For example, one or multiple PGWs 225 may be designated as PGWs that provide network access in correspondence to network access rights defined in table 250 of HSS 220. SGW 210 may send a create session request to the selected PGW 225. The create session request may include the IMSI. As further illustrated in FIG. 2C, PGW 225 may send a PDN bearer request to PCRF 230. The PDN bearer request may include the IMSI. PCRF 230 may obtain the temporary subscriber profile information from HSS 220 based on the IMSI. PGW 225 may receive a PDN bearer response from PCRF 230. PGW 230 may send a create session response to MME 215 via SGW 210, and an attachment accept may be sent from MME 125 to eNB 207. ENB 207 and user device 115 may establish a PDN bearer connection. The PDN bearer connection may provide limited network access.

Referring to FIG. 2D, user device 115 may establish a PDN bearer connection to server 235. In this example, the non-subscribed user selects a service plan offered by server 235. Server 235 may send an update to HSS 220. For example, the update may include the IMSI and whether the non-subscribed user self-subscribed to a service plan, what service plan, and/or other details pertaining to the service plan. Based on the update, HSS 220 may appropriately update table 250 and delete the temporary subscriber profile. HSS 220 may store a subscriber profile corresponding to the service plan selected by the user. According to another example, if the non-subscribed user did not select a service plan, server 235 may send an update to HSS 220 that includes the IMSI and indicates the non-subscribed user did not self-subscribe to a service plan. Depending on the network rules and policies associated with updating table 250, various fields of table 250 may be updated. For example, HSS 220 may update self-activation field 270 to indicate a "no" and/or update time information indicated in timer field 275.

Although, FIGS. 2C and 2D illustrate an exemplary process in which self-subscription based on a smart card may be implemented, according to other embodiments, the types of messages, the content of the messages, and/or the order of messages may be different. Additionally, although not illustrated and described, the process may include additional messaging pertaining to normal connection setup (e.g., authorization, Evolved Packet System (EPS) Session Management (ESM), network address assignment, etc.).

Figure 2E:
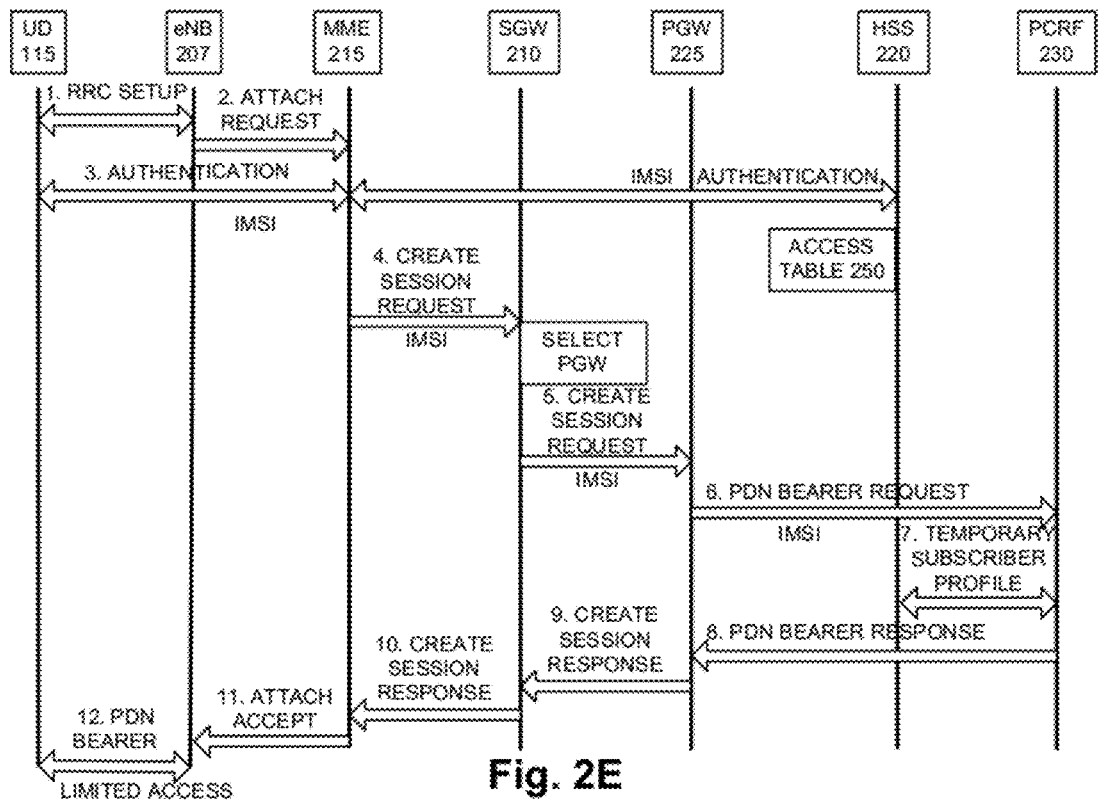
FIGS. 2E and 2F are diagrams illustrating an exemplary process in which self-reactivation of suspended services based on a smart card may be implemented
Figure 2F:
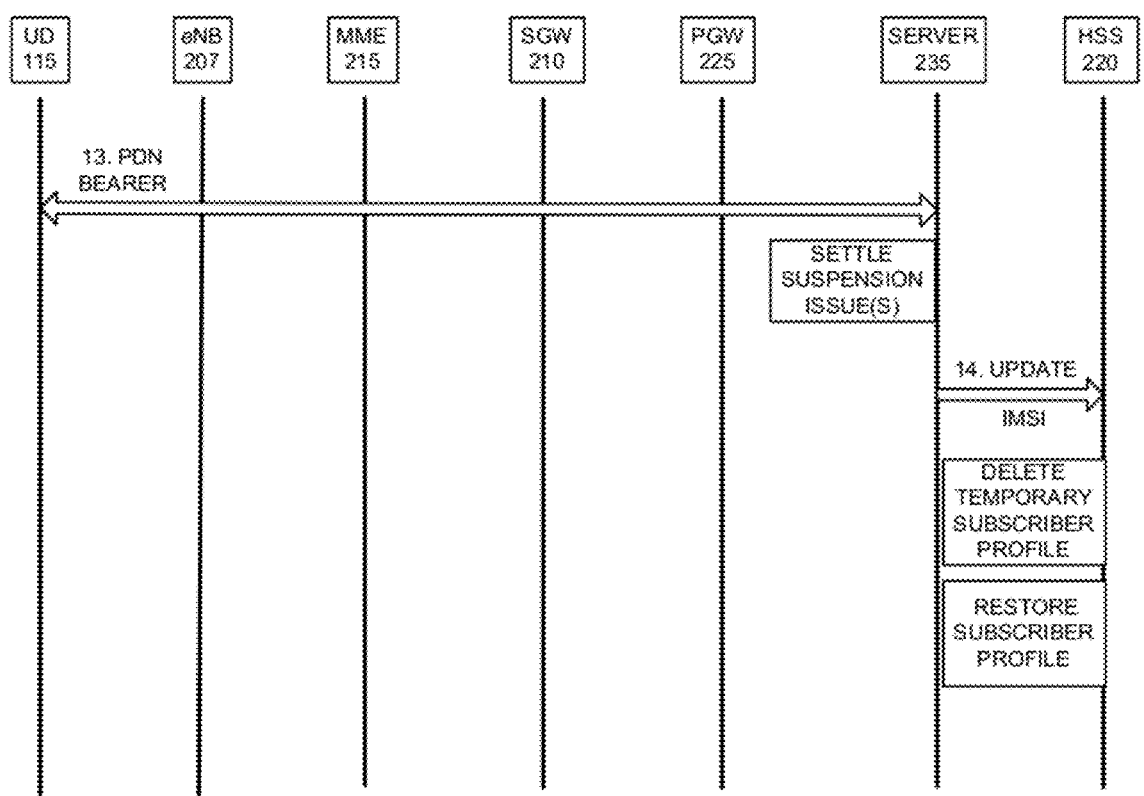

According to another embodiment, FIGS. 2E and 2F may illustrate an exemplary process in which a suspended, subscribed user may reactivate services that may be suspended. Referring to FIG. 2E, after an RRC connection is established, MME 215 may send an authentication request to HSS 220 that includes the IMSI. The authentication request may also include information pertaining to authentication (e.g., an authentication key, etc.). HSS 220 may access table 250 based on the IMSI. HSS 220 may then determine whether self-reactivation is permitted based on self-activation field 270. HSS 220 may also access timer field 275 to determine if a time period to reactive services is permitted, as well as other fields (e.g., key field 265 for authentication purposes).

According to other embodiments, HSS 220 may access a field (not illustrated in FIG. 2B) to determine a type of user (e.g., a subscribed user, a non-subscribed user, a suspended, subscribed user, etc.)).

In this example, HSS 220 may determine that the suspended, subscribed user may reactivate suspended services. HSS 220 may generate a temporary subscriber profile using the information stored in activation profile index 280. In the event that multiple activation profiles are stored, HSS 220 may select the appropriate activation profile based on other fields in table 220, such as timer field 275 (e.g., resuming of services), type of user, type of communication (e.g., machine-to-machine, etc.), etc. HSS 220 may also authenticate the smart card based on smart card identifier field 255. For example, HSS 220 may compare the information in smart card identifier field 255 with authentication information included in the authentication request. HSS 220 may send an authentication response to MME 215. The authentication response may include the IMSI.

MME 215 may then send a create session request to SGW 210. SGW 210 may select a PGW 225 based on the IMSI. For example, one or multiple PGWs 225 may be designated as PGWs that provide network access, in correspondence to network access rights defined in table 250 of HSS 220, to reactivate services. SGW 210 may send a create session request to the selected PGW 225. The create session request may include the IMSI. As further illustrated in FIG. 2E, PGW 225 may send a PDN bearer request to PCRF 230. The PDN bearer request may include the IMSI. PCRF 230 may obtain the temporary subscriber profile information from HSS 220 based on the IMSI. PGW 225 may receive a PDN bearer response from PCRF 230. PGW 230 may send a create session response to MME 215 via SGW 210, and an attachment accept may be sent from MME 125 to eNB 207. ENB 207 and user device 115 may establish a PDN bearer connection.

Referring to FIG. 2F, user device 115 may establish a PDN bearer connection to server 235. Server 235 may provide access to interfaces that allow the suspended, subscribed user to resolve suspension issue(s), such as, billing information, account information, etc. In this example, the suspended, subscribed user settles the suspension issue(s) (e.g., settles an outstanding bill, etc.) with server 235. Server 235 may send an update to HSS 220. For example, the update may include the IMSI and whether the suspended, subscriber resolved the suspension issue(s). Based on the update, HSS 220 may appropriately update table 250 and delete the temporary subscriber profile. HSS 220 may restore a subscriber profile corresponding to the service plan associated with the user.

According to another example, if the suspended, subscribed user did not resolve the suspension issue(s), server 235 may send an update to HSS 220 that includes the IMSI and indicates the suspended, subscribed user did not resolve the suspension issue(s). Depending on the network rules and policies associated with updating table 250, various fields of table 250 may be updated. For example, HSS 220 may update self-activation field 270 to indicate a "no" and/or update time information indicated in timer field 275.

Although, FIGS. 2E and 2F illustrate an exemplary process in which reactivation of suspended services based on a smart card may be implemented, according to other embodiments, the types of messages, the content of the messages, and/or the order of messages may be different. Additionally, although not illustrated and described, the process may include additional messaging pertaining to normal connection setup (e.g., authorization, ESM, network address assignment, etc.).

Additionally, while the exemplary processes illustrated and described with reference to FIGS. 2C-2F have been described with reference to the LTE communication standard and devices associated therewith, according to other exemplary embodiments, similar processes may be performed by a different type of network. By way of example, the GSM network may include an HLR to store user profiles. According to such an embodiment, the HLR may perform processes analogous and/or similar to those described with respect to HSS 220.

Figure 3:
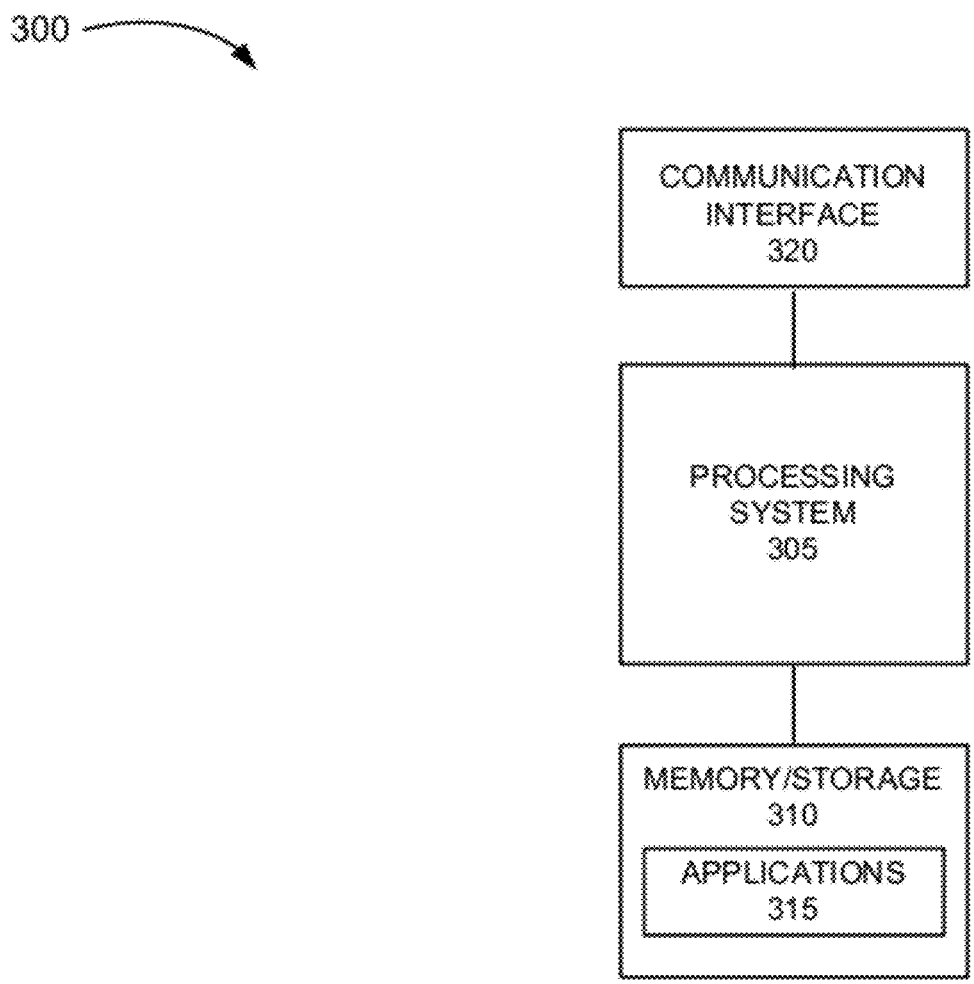
FIG. 3 is a diagram illustrating exemplary components of a device that may correspond to one or more of the devices in the exemplary environments depicted in FIGS. 1A and 2A.

FIG. 3 is a diagram illustrating exemplary components of a device 300 that may correspond to one or more of the devices in the exemplary environments depicted in FIGS. 1A and 2A. For example, device 300 may correspond to network device 110, user device 115, eNB 207, SGW 210, MME 215, HSS 220, PGW 225, PCRF 230, and/or server 235. As illustrated, device 300 may include a processing system 305, memory/storage 310 including applications 315, and a communication interface 320. According to other implementations, device 300 may include fewer components, additional components, different components, and/or a different arrangement of components than those illustrated in FIG. 3 and described herein.

Processing system 305 may include one or multiple processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 305 may control the overall operation, or a portion of operation(s) performed by device 300. Processing system 305 may perform one or multiple operations based on an operating system and/or various applications (e.g., applications 315). Processing system 305 may access instructions from memory/storage 310, from other components of device 300, and/or from a source external to device 300 (e.g., another device, a network, etc.).

Memory/storage 310 may include one or multiple memories and/or one or multiple secondary storages. For example, memory/storage 310 may include a random access memory (RAM), a dynamic random access memory (DRAM), a read only memory (ROM), a programmable read only memory (PROM), a flash memory, and/or some other type of storing medium (e.g., a computer-readable medium, a compact disk (CD), a digital versatile disk (DVD), or the like). Memory/storage 310 may include a hard disk (e.g., a magnetic disk, an optical disk, a magneto-optic disk, a solid state disk, etc.) or some other type medium, along with a corresponding drive. Memory/storage 310 may be external to and/or removable from device 300, such as, for example, a Universal Serial Bus (USB) memory stick, a dongle, a hard disk, mass storage, off-line storage, or the like.

The term "computer-readable medium," as used herein, is intended to be broadly interpreted to include, for example, a memory, a secondary storage, a CD, a DVD, or another type of tangible storage medium. Memory/storage 310 may store data, application(s), and/or instructions related to the operation of device 300.

Applications 315 may include software that provides various services or functions. For example, applications 315 may include applications that perform various network-related and/or communication related functions. According to an exemplary embodiment, applications 315 may include one or multiple applications to implement self-subscription and/or reactivation of suspended services, as described herein.

Communication interface 320 may permit device 300 to communicate with other devices, networks, systems and/or the like. Communication interface 320 may include one or multiple wireless interfaces and/or wired interfaces. Communication interface 320 may include one or multiple transmitters, receivers, and/or transceivers. Communication interface 320 may include interfaces according to one or multiple versions of the LTE communication standard and/or the eHRPD communication standard.

Device 300 may perform operations in response to processing system 305 executing software instructions stored memory/storage 310. For example, the software instructions may be read into memory/storage 310 from another memory/storage 310 or from another device via communication interface 320. The software instructions stored in memory/storage 310 may cause processing system 305 to perform processes described herein. Alternatively, according to another implementation, device 300 may perform processes based on the execution of hardware (e.g., processing system 305, etc.), the execution of hardware and firmware, or the execution of hardware, software (e.g., applications 315), and firmware.

Figure 4:
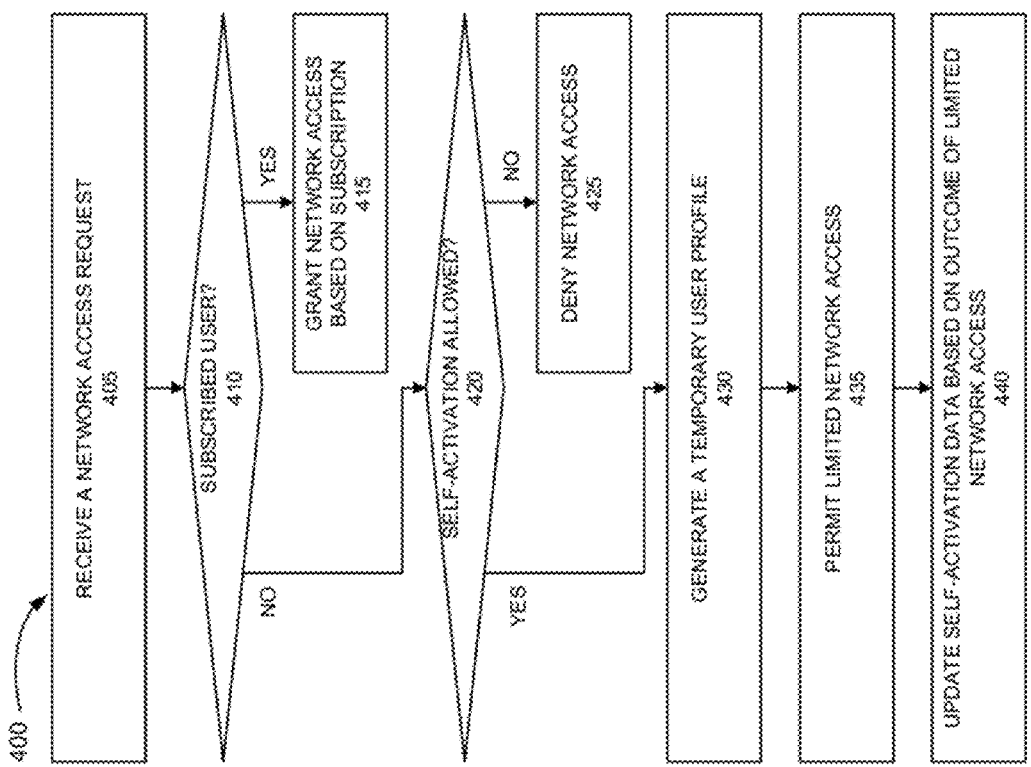
FIG. 4 is a flow diagram illustrating an exemplary process for self-subscribing to services based on a smart card when the user is not a subscribed user.

FIG. 4 is a flow diagram illustrating an exemplary process 400 for self-subscribing to services based on a smart card. For example, process 400 may be performed when a non-subscribed user of a network attempts to access the network. Although process 400 is described in relation to devices associated with an LTE network, according to other embodiments, process 400 may performed by other devices associated with a different type of network.

Process 400 may include receiving a network access request (block 405). For example, as previously described, user device 115 having smart card 120 may send a network access request (e.g., an RRC setup request, an authentication request, or some other type of message) to establish a connection and/or a session with network 205. The access request may include an IMSI. The IMSI may be routed to HSS 220.

It may be determined whether the user is a subscribed user (e.g., a subscriber) (block 410). For example, HSS 220 may determine whether the user is a subscribed user or not based on table 250. For example, table 250 may include a mapping between IMSI field 260 and a user field that indicates whether the user is a subscribed user. If it is determined that the user is a subscribed user (block 410—YES), network access may be granted based on the subscribed user's subscription (block 415). For example, network 205 may grant access to the subscribed user in accordance with his/her subscription, network policies, etc.

If it is determined that the user is not a subscribed user (block 410—NO), it may be determined whether self-activation is allowed (block 420). For example, as previously described, HSS 220 may access table 250 to determine whether self-activation is allowed. For example, HSS 220 may select an appropriate self-activation record of table 250 based on IMSI field 260. According to other embodiments, HSS 220 may use smart card identifier field 255 and IMSI field 260, or smart card identifier field 255. According to such embodiments, the access request may include a smart card identifier associated with smart card 120. HSS 220 may determine whether self-activation is permitted with respect to the identified self-activation record based on self-activation field 270.

If it is determined that self-activation is not allowed (block 420—NO), network access may be denied (block 425). For example, HSS 220 may deny access to network 205 for user device 115. For example, an access response indicating that access is denied may be sent to user device 115.

If it is determined that self-activation is allowed (block 420—YES), a temporary user profile may be generated (block 430). For example, as previously described, HSS 220 may generate a temporary user profile on behalf of the user. The temporary user profile may be generated based on information included in activation profile index field 280. HSS 220 may store the temporary user profile with a mapping to the IMSI and/or smart card identifier.

The user may be granted limited network access (block 435). For example, when the temporary user profile is generated, the non-subscribed user may be granted limited access. For example, network 205 may provide limited network access via a designated PGW 225. PGW 225 may receive access policies, quality-of-service policies, etc., pertaining to this limited network access from PCRF 230. Based on the limited network access, the non-subscribed user may be directed to a web server, a call center, etc., to provide user interfaces that permit the non-subscribed user to view or hear available service plans, service offers, etc., and sign-up for a service plan.

The self-activation data may be updated based on an outcome of the limited network access (block 440). For example, as previously described, HSS 220 may update table 250 in accordance with whether the non-subscribed user self-subscribes to a service plan. For example, HSS 220 may update one or more fields, such as, timer field 275, self-activation field 270, or activation profile index field 280 when the non-subscribed user does not self-subscribe. Alternatively, HSS 220 may delete the temporary user profile and store a subscriber profile in accordance with a selected service plan when the non-subscribed user self-subscribes to a service plan.

Although FIG. 4 illustrates an exemplary process 400 for implementing self-subscription, according to other embodiments, process 400 may include additional operations, fewer operations, and/or different operations than those illustrated in FIG. 4 and described. For example, according to other embodiments, the determination of the type of user may be omitted. According to such embodiments, the IMSI, the time information, and the self-activation information may be used to grant or deny network access.

Figure 5:
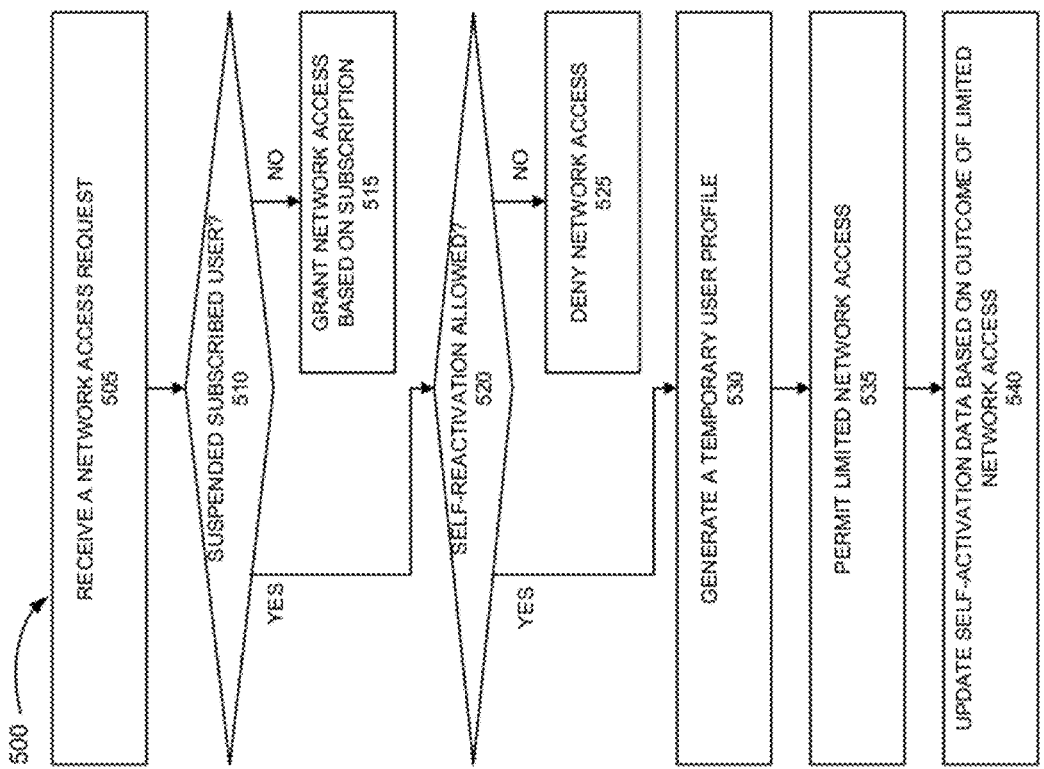
FIG. 5 is a flow diagram illustrating an exemplary process for self-reactivation of suspended services based on a smart card when the user is a suspended, subscribed user.

FIG. 5 is a flow diagram illustrating an exemplary process for self-reactivation of suspended services based on a smart card. For example, process 500 may be performed when a suspended, subscribed user (e.g., a former subscriber who has not paid his/her bills for services, etc.) wants to access a network from which he/she was suspended. Although process 500 is described in relation to devices associated with an LTE network, according to other embodiments, process 500 may performed by other devices associated with a different type of network.

Process 500 may include receiving a network access request (block 505). For example, as previously described, user device 115 having smart card 120 may send a network access request (e.g., an RRC setup request, an authentication request, or some other type of message) to establish a connection and/or a session with network 205. The access request may include an IMSI. The IMSI may be routed to HSS 220.

It may be determined whether the user is a suspended, subscribed user (block 510). For example, HSS 220 may determine whether the user is a suspended, subscribed user or not based on table 250. For example, table 250 may include a mapping between IMSI field 260 and a user field that indicates whether the user is a suspended, subscribed user. If it is determined that the user is not a suspended, subscribed user (block 510—NO), network access may be granted based on the subscribed user's subscription (block 515). For example, network 205 may grant access to the subscribed user in accordance with his/her subscription, network policies, etc.

If it is determined that the user is a suspended, subscribed user (block 510—YES), it may be determined whether self-reactivation is allowed (block 520). For example, as previously described, HSS 220 may access table 250 to determine whether self-reactivation is allowed. For example, HSS 220 may select an appropriate self-activation record of table 250 based on IMSI field 260. According to other embodiments, HSS 220 may use smart card identifier field 255 and IMSI field 260, or smart card identifier field 255. According to such embodiments, the access request may include a smart card identifier associated with smart card 120. HSS 220 may determine whether self-activation is permitted with respect to the identified self-activation record based on self-activation field 270.

If it is determined that self-activation is not allowed (block 520—NO), network access may be denied (block 525). For example, HSS 220 may deny access to network 205. For example, an access response indicating that access is denied may be sent to user device 115.

If it is determined that self-activation is allowed (block 520—YES), a temporary user profile may be generated (block 530). For example, as previously described, HSS 220 may generate a temporary user profile on behalf of the user. The temporary user profile may be generated based on information included in activation profile index field 280. HSS 220 may store the temporary user profile with a mapping to the IMSI and/or smart card identifier.

The user may be granted limited network access (block 535). For example, when the temporary user profile is generated, the suspended, subscribed user may be granted limited access. For example, network 205 may provide limited network access via a designated PGW 225. PGW 225 may receive access policies, quality-of-service policies, etc., pertaining to this limited network access from PCRF 230. Based on the limited network access, the suspended, subscribed user may be directed to a web server, a call center, etc., to provide user interfaces that permit the suspended, subscribed user to resolve suspension issue(s).

The self-activation data may be updated based on an outcome of the limited network access (block 540). For example, as previously described, HSS 220 may update table 250 in accordance with whether the suspended, subscribed user resolves the suspension issue(s). For example, HSS 220 may update one or more fields, such as, timer field 275, self-activation field 270, or activation profile index field 280 when the suspended, subscribed user does not resolve suspension issue(s). Alternatively, HSS 220 may delete the temporary user profile and restore a subscriber profile when the suspended, subscribed user resolves the suspension issue(s).

Although FIG. 5 illustrates an exemplary process 500 for implementing self-subscription, according to other embodiments, process 500 may include additional operations, fewer operations, and/or different operations than those illustrated in FIG. 5 and described. For example, according to other embodiments, the determination of the type of user may be omitted. According to such embodiments, the IMSI, the time information, and the self-activation information may be used to grant or deny network access.

The foregoing description of implementations provides illustration, but is not intended to be exhaustive or to limit the implementations to the precise form disclosed. Accordingly, modifications to the implementations described herein may be possible. For example, an IMSI, a user identifier, and/or a subscription identifier, as described herein, may be stored on a user device. For example, the user device may not use a smart card. Additionally, or alternatively, while this description has made reference to non-subscriber users and suspended, subscribed users, the self-subscription processes and the reactivation processes described herein may be applicable to other types or characterizations of users and/or other types or characterizations of situations defined by, for example, network administrators, etc. In this regard, non-subscribed users and suspended, subscribed users may be interpreted broadly, and while examples of such users have been provided in this description, these examples are not exhaustive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 4 and 5, the order of the blocks may be modified in other implementations. Further, non-dependent blocks may be performed in parallel. Additionally, with respect to other processes described in this description, the order of operations may be different according to other implementations, and/or operations may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware, such as one or more processors, one or more microprocessors, one or more ASICs, one or more FPGAs, etc., a combination of hardware and software, a combination of hardware, software, and firmware, or a combination of hardware and firmware.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
    receiving a network access request that includes an international mobile subscriber identity (IMSI) stored by a smart card associated with a user device and authentication information;
    authenticating the smart card based on a comparison between the authentication information and self-activation data, wherein the self-activation data includes a mapping between IMSIs and authentication data;
    determining whether self-subscription to a service plan or reactivation of a suspended service plan is permitted based on the self-activation data, wherein the self-activation data includes a mapping between IMSIs and data that indicates a granting or a denying of network access;
    selecting network access rights based on the self-activation data when it is determined that self-subscription to the service plan or reactivation of the suspended service plan is permitted;
    generating a temporary user profile based on the selected network access rights; and
    providing limited network access to the user device, wherein the limited network access permits a user to self-subscribe to the service plan or reactivate the suspended service plan based on the temporary user profile.

2. The method of claim 1, further comprising:
    determining whether the user is a non-subscribed user or a suspended, subscribed user.

3. The method of claim 1, further comprising:
    storing timer data that indicates a time period in which the user is permitted to self-subscribe or reactivate the suspended service plan, and wherein the determining further comprises:
    determining whether the network access request is received within the time period.

4. The method of claim 1, further comprising:
    deleting the temporary user profile when the user self-subscribes to the service plan or reactivates the suspended service plan;
    storing a user profile corresponding to the service plan that the user self-subscribes or reactivating a service plan associated with the suspended service plan; and
    providing network access to the user in correspondence to the service plan or the reactivated service plan.

5. The method of claim 1, further comprising:
    denying the network access request when the self-activation data indicates that no self-activation is permitted.

6. The method of claim 1, further comprising:
    updating the self-activation data based on an outcome of the providing of the limited network access to the user device.

7. The method of claim 1, wherein the selecting comprises:
    selecting the network access rights that correspond to self-subscription or reactivation of suspended services.

8. A network device comprising:
    a communication interface to send and to receive;
    a memory to store instructions; and
    a processor to execute the instructions to:
        receive, via the communication interface, a network access request that includes an international mobile subscriber identity (IMSI) associated with a smart card of a user device;
        determine whether network access is permitted or denied based on a database including self-activation data, wherein the self-activation data includes a mapping between IMSIs and data that indicates a granting or a denying of network access to the user device;
        generate a temporary subscriber profile when it is determined that self-activation data pertaining to the received IMSI indicates that network access is permitted; and
    send, via the communication interface, a network access response granting network access based on the temporary subscriber profile, wherein the database includes authentication information for each IMSI, and the network access request includes authentication information, and wherein the processor to execute the instructions to:
    authenticate the smart card based on the authentication information mapped to the IMSI stored in the database with the authentication information included in the network access request.

9. The network device of claim 8, wherein the network device corresponds to a home subscriber server or a home location register.

10. The network device of claim 8, wherein the self-activation data includes:
timer data that indicates a time period in which a user is granted network access or a time period in which the user is denied network access;
a smart card identifier associated with each IMSI; and
one or more activation profiles for each IMSI, wherein an activation profile includes defining network access rights, and the processor to execute the instructions to:
generate the temporary subscriber profile based on one of the one or more activation profiles associated with the received IMSI.

11. The network device of claim 10, wherein the processor to execute the instructions to:
determine whether a user of the user device and the smart card is a non-subscribed user or a suspended, subscribed user.

12. The network device of claim 11, wherein the processor to execute the instructions to:
select one of the one or more activation profiles based on determining whether the user of the user device and the smart card is a non-subscribed user or a suspended, subscribed user.

13. The network device of claim 10, wherein the processor to execute the instructions to:
update the timer data based on whether a user of the user device and the smart card successfully subscribes to a service plan or resolves a suspension of a service plan during the network access.

14. The network device of claim 8, wherein the processor to execute the instructions to:
determine a type of user based on the IMSI included in the network access request.

15. The network device of claim 8, wherein the network access response includes the IMSI and the network access response is sent to a mobility management entity.

16. The network device of claim 8, wherein the processor to execute the instructions to:
receive an update pertaining to whether a user of the user device and the smart card successfully subscribes to a service plan or resolves a suspension of a service plan during the network access; and
delete the temporary user profile when the update indicates that the user self-subscribes to the service plan or reactivates the suspended service plan.

17. A non-transitory computer-readable medium comprising executable instructions for execution by at least one processing system, the instructions causing the at least one processing system to:
receive a network access request that includes a subscription identifier associated with a user device;
determine whether network access is permitted or denied based on self-activation data and the received subscription identifier, wherein the self-activation data includes a mapping between subscription identifiers and data that indicates a granting or a denying of network access;
generate a temporary subscriber profile when it is determined that self-activation data pertaining to the received subscription identifier indicates that network access is permitted; and
send a network access response granting network access based on the temporary subscriber profile, wherein the self-activation data includes:
timer data that indicates a time period in which a user is granted network access or a time period in which the user is denied network access;
a smart card identifier associated with each subscription identifier; and
one or more activation profiles for each subscription identifier, wherein an activation profile includes network access rights data, and the instructions further causing the at least one processing system to:
generate the temporary subscriber profile based on one of the one or more activation profiles associated with the received subscription identifier.

18. The non-transitory computer-readable medium of claim 17, wherein the self-activation data includes one or more activation profiles for the received subscription identifier, wherein an activation profile includes defining network access rights, and the instructions includes one or more instructions that cause the at least one processing system to:
select one of the one or more activation profiles based on whether the network access request corresponds to a machine-to-machine communication or a user communication.

19. The non-transitory computer-readable medium of claim 17, comprising the instructions that further cause the at least one processing system to:
receive an update pertaining to whether a user of the user device and a smart card successfully subscribes to a service plan or resolves a suspension of a service plan during the network access; and
delete the temporary user profile when the update indicates that the user self-subscribes to the service plan or reactivates the suspended service plan.

20. The non-transitory computer-readable medium of claim 17, and the instructions include one or more instructions that cause the at least one processing system to:
update the timer data based on a whether a user of the user device and a smart card successfully subscribes to a service plan or resolves a suspension of a service plan during the network access.

21. A network device comprising:
a communication interface to send and to receive;
a memory to store instructions; and
a processor to execute the instructions to:
receive, via the communication interface, a network access request that includes an international mobile subscriber identity (IMSI) associated with a smart card of a user device;
determine whether network access is permitted or denied based on a database including self-activation data, wherein the self-activation data includes a mapping between IMSIs and data that indicates a granting or a denying of network access to the user device;
generate a temporary subscriber profile when it is determined that self-activation data pertaining to the received IMSI indicates that network access is permitted; and
send, via the communication interface, a network access response granting network access based on the temporary subscriber profile, wherein the self-activation data includes:
timer data that indicates a time period in which a user is granted network access or a time period in which the user is denied network access;
a smart card identifier associated with each IMSI; and
one or more activation profiles for each IMSI, wherein an activation profile includes defining network access rights, and the processor to execute the instructions to:

generate the temporary subscriber profile based on one of the one or more activation profiles associated with the received IMSI.

22. A non-transitory computer-readable medium comprising executable instructions for execution by at least one processing system, the instructions causing the at least one processing system to:
receive a network access request that includes a subscription identifier associated with a user device;
determine whether network access is permitted or denied based on self-activation data and the received subscription identifier, wherein the self-activation data includes a mapping between subscription identifiers and data that indicates a granting or a denying of network access;
generate a temporary subscriber profile when it is determined that self-activation data pertaining to the received subscription identifier indicates that network access is permitted; and
send a network access response granting network access based on the temporary subscriber profile, wherein the self-activation data includes timer data that indicates a time period in which a user is granted network access or a time period in which the user is denied network access, and the instructions include one or more instructions that cause the at least one processing system to:
update the timer data based on a whether a user of the user device and a smart card successfully subscribes to a service plan or resolves a suspension of a service plan during the network access.

* * * * *